Aug. 19, 1947.   W. L. O'BRIEN   2,426,044
HEAT TRANSFER DEVICE WITH LIQUID LIFTING CAPILLARY SURFACE
Filed Sept. 19, 1941
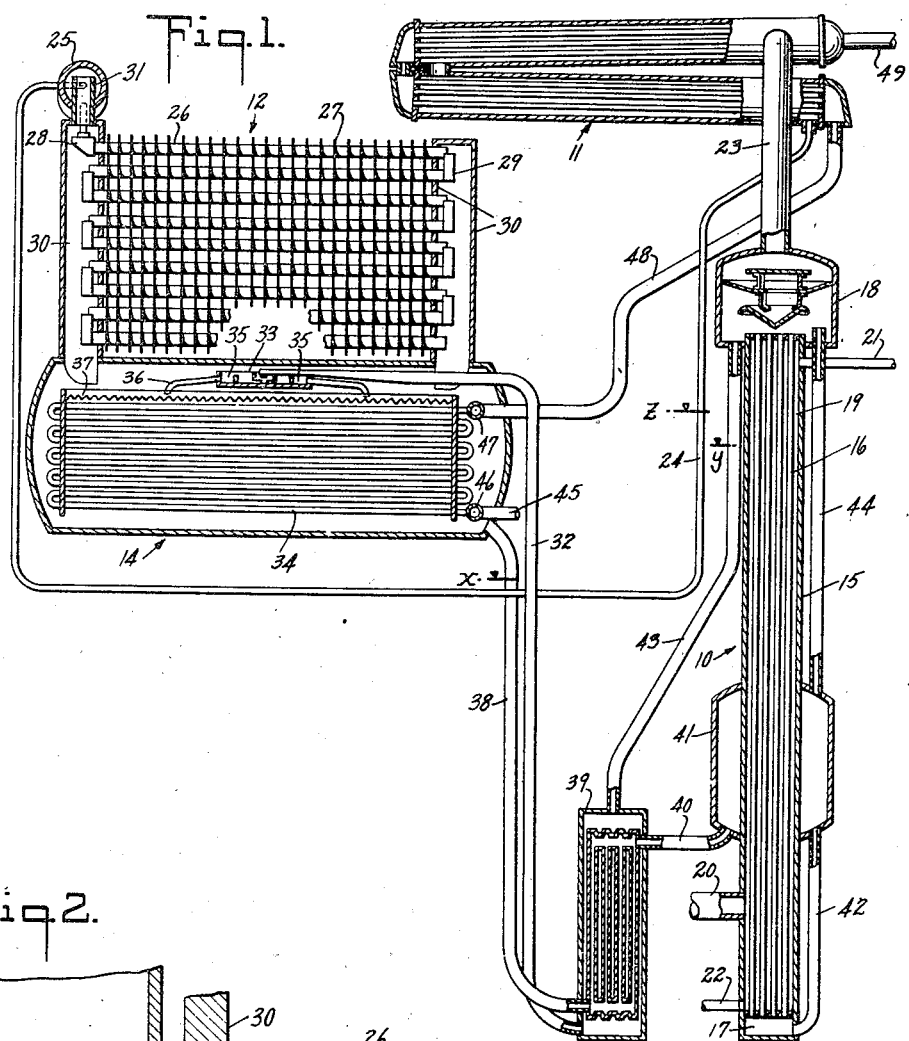
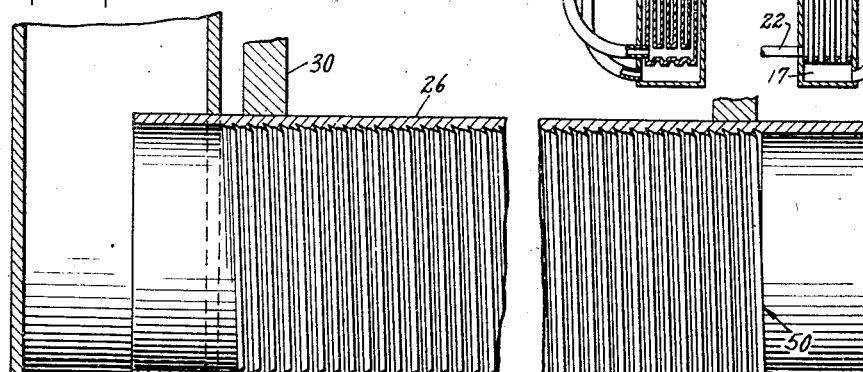
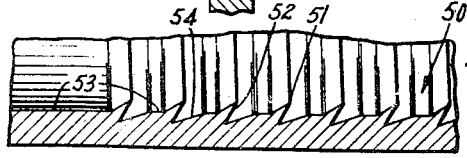

Patented Aug. 19, 1947

2,426,044

UNITED STATES PATENT OFFICE 2,426,044

HEAT TRANSFER DEVICE WITH LIQUID LIFTING CAPILLARY SURFACE

William L. O'Brien, Evansville, Ind., assignor to Servel, Inc., New York, N. Y., a corporation of Delaware Application September 19, 1941, Serial No. 411,459

12 Claims. (Cl. 257—262)

My invention relates to refrigeration systems of an absorption type, and has for its object to provide an improvement whereby the spreading of liquid in piping is promoted and facilitated.

In refrigeration systems of this type, particularly in evaporators and absorbers, it is desirable to spread liquid over as large a surface area as possible. I accomplish this by roughening the inside wall of piping in such a manner that the exposed surface area is increased tremendously with liquid repeatedly climbing up the sides of the piping during flow therethrough. In the preferred embodiment of the invention, the inside wall of piping is formed with a helical groove to provide small capillary passages in which liquid rises by capillary action to effect spreading of liquid over the inside wall of the piping.

The invention, together with the above and other objects and advantages thereof, will be better understood as I next describe the invention embodied in an absorption refrigeration system like that described in application Serial No. 239,762 of A. R. Thomas and P. P. Anderson, Jr., filed November 10, 1938, now Patent No. 2,282,503, granted May 12, 1942.

In the accompanying drawing forming a part of this specification,

Fig. 1 more or less diagrammatically illustrates an absorption refrigeration system embodying the invention;

Fig. 2 is an enlarged fragmentary vertical sectional view of a part of the evaporator shown in Fig. 1 to illustrate the invention more clearly; and Fig. 3 is an enlarged fragmentary sectional view of a part of the piping shown in Fig. 2 to illustrate more clearly the manner in which the interior of the piping is roughened.

Referring to Fig. 1, the invention is embodied in a two-pressure absorption refrigeration system like that described in the Thomas and Anderson application referred to above. A system of this type operates at low pressures and includes a generator or vapor expeller 10, a condenser 11, an evaporator 12 and an absorber 14 which are interconnected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system.

In Fig. 1 the generator 10 includes an outer shell 15 within which are disposed a plurality of riser tubes 16 having the lower ends thereof communicating with a bottom space 17 and the upper ends thereof extending into and above the bottom of a vessel 18. The space surrounding the tubes 16 forms a chamber 19 within shell 15 to which steam is supplied through a conduit 20. The chamber 19 provides for full length heating of the tubes 16 with the top part of the chamber being vented at 21 to atmosphere. A conduit 22 is connected to the bottom part of shell 15 for draining condensate from chamber 19.

The system operates at a partial vacuum and may be charged with a solution of refrigerant in absorption liquid, such as, for example, a water solution of lithium chloride or lithium bromide or a suitable mixture of such salts. With steam being supplied through conduit 20 to chamber 19 at atmospheric pressure, heat is applied to tube 16 whereby water vapor is expelled from solution, such expelled vapor being effective to raise liquid absorbent by gas or vapor lift action with the expelled water vapor forming a central core within an upwardly rising annulus of the liquid. The expelled vapor passes from the upper ends of tubes 16 into the vessel 18, and thence flows through a conduit 23 into condenser 11 in which the expelled vapor is liquefied. The condensate formed in condenser 11 flows through a U-tube 24 into a flash chamber 25 and from the latter into evaporator 12.

The evaporator 12 includes a plurality of horizontal banks of tubes 26 disposed one above the other and to which are secured heat transfer fins 27 to provide a relatively extensive heat transfer surface. The liquid flowing to evaporator 12 is divided in any suitable manner for flow through the uppermost banks of tubes 26. The dividing of liquid may be effected by providing a liquid distributing trough 28 into which the liquid flows from flash chamber 25, as described in application Serial No. 350,235 of Albert R. Thomas, filed August 3, 1940, now Patent No. 2,317,234, issued April 20, 1943. The refrigerant passes into successively lower banks of tubes through suitable end connections 29 which are disposed in end headers 30 and which are open to permit escape of vapor from the tubes. Any excess liquid is discharged from the lowermost bank of tubes 26.

The refrigerant evaporates in evaporator 12 to produce a refrigerating or cooling effect with consequent absorption of heat from the surroundings, as from a stream of air flowing over the exterior surfaces of the evaporator. The refrigerant vapor formed in tubes 26 flows out into the end headers 30 which are connected at their lower ends to absorber 14. The flash chamber 25 serves as a place in which may occur vapor flashing of liquid flowing to evaporator 12 through U-tube 24. The flashed vapor formed in the initial cooling of liquid flowing to chamber 25 passes through a conduit 31 into one of the headers 30 and mixes with vapor formed in the evaporator 12, so that disturbances in the evaporator due to vapor flashing are avoided.

In absorber 14 refrigerant vapor is absorbed into absorption liquid which enters through a conduit 32. The entering absorption liquid flows into a vessel 33 in which liquid is distributed laterally or crosswise of a plurality of vertically disposed pipe banks 34 which are arranged alongside of each other. The liquid flows from the center part of vessel 33 into laterally disposed end chambers 35 and thence through conduits 36 into a plurality of liquid holders and distributors 37 which extend lengthwise of and above the uppermost horizontal tubes of pipe banks 34. Absorption liquid is siphoned over the walls of liquid holders 37 to effect complete wetting of the uppermost horizontal tubes. Liquid drips from each horizontal tube onto the next lower tube, whereby all of the tubes are wetted with a film of liquid.

Refrigerant is absorbed into solution by the absorption liquid in absorber 14 and solution flows therefrom through a conduit 38, a first passage in a liquid heat exchanger 39, a conduit 40, vessel 41 and conduit 42 into the bottom space 17 of generator 10. Refrigerant vapor is expelled out of solution in generator 10 by heating, and the solution is raised by gas or vapor lift action in riser tubes 16, as explained above.

The absorption liquid in vessel 18 is deprived of refrigerant since refrigerant vapor has been expelled therefrom into generator 10. This absorption liquid flows through a conduit 43, a second passage in liquid heat exchanger 39, and conduit 32 into the top part of absorber 14. This circulation of absorption liquid results from the raising of liquid in riser tubes 16, whereby the liquid can flow to absorber 14 and return from the latter to generator 10 by force of gravity. The upper part of vessel 41 and vessel 18 are connected by a conduit 44, so that the pressure in vessel 41 is equalized with the pressure in the top part of generator 10 and condenser 11.

The absorber 14 and condenser 11 constitute heat rejecting parts of the refrigerating system and are cooled by a suitable cooling fluid, such as water, for example. The cooling water enters the bottom part of the pipe banks 34 through a conduit 45 and manifold 46, and leaves the top part of the pipe banks through a manifold 47 and a conduit 48. The conduit 48 is connected to condenser 11 whereby the same cooling fluid can be utilized to cool both of the heat rejecting parts, the cooling fluid then leaving the condenser through a conduit 49.

The system operates at low pressures with the generator 10 and condenser 11 operating at one pressure and the evaporator 12 and absorber 14 operating at a lower pressure, the pressure differential therebetween being maintained by liquid columns. Thus, the liquid in U-tube 24 maintains the pressure differential between condenser 11 and evaporator 12, the liquid column in conduit 38 maintains the pressure differential between the outlet of absorber 14 and generator 10, and the liquid column formed in conduit 32 maintains the pressure differential between the inlet of absorber 14 and the upper part of generator 10. During operation of the system, the liquid columns may form in conduits 38, 43 and 24 to the levels $x$, $y$, and $z$, for example.

The condenser 11 and evaporator 12 are so located and positioned that, when the column of liquid builds up in the left-hand leg of U-tube 24, liquid will always overflow into the top part of evaporator 12. When the operation of the system is first started and the pressure differential between condenser 11 and evaporator 12 is zero, the column of liquid formed in the righthand of U-tube 24 will be sufficiently high to cause condensate to overflow by gravity from the lefthand leg thereof into evaporator 12. After the pressure differential builds up in the system so that the liquid level in the righthand leg of U-tube 24 is at some point, such as $z$, liquid will still flow by gravity from the condenser to the evaporator.

In accordance with my invention, the spreading of liquid is effected within the evaporator tubes 26 by forming the inside walls thereof with a helical groove 50 of the character shown in Figs. 2 and 3. The groove 50 is formed in such a manner that an inwardly extending lip 51 is provided, whereby one face or side 52 of the V-shaped passages projects inwardly a slight distance beyond the inside wall portions 53 disposed between successive turns of the helical groove. With this arrangement the V-shaped passages having the faces 52 and 54 are not at right angles to the lengths of the tubes, but instead are inclined at an angle from the vertical. Roughening the inside walls of the tubes 26 by forming the grooves 50 is extremely advantageous, because in doing this the inside surface area is practically doubled. This provides a heat transfer surface which is much greater than the contact surface provided by tubes having the usual smooth inner walls.

In the illustrated embodiment of the invention, the tubes 26 are as level as possible with the liquid introduced into the evaporator merely trickling along the extreme bottom parts of the tubes. As the liquid flows along the bottom parts of the grooves 50, the individual turns of the grooves become filled with liquid and such liquid flows along the V-shaped passages and climbs upwardly at the sides of the tubes by capillary action. In the event the capillary action is broken at any time in any particular passage, upward climbing or creeping of liquid is repeated when a sufficient quantity of liquid again accumulates or collects in the bottom part of such passage or turn of the groove.

With liquid merely trickling in the tubes 26 the total amount of liquid held or retained in evaporator 12 is at a minimum, and, at the same time, roughening of the inside walls of the tubes provides a relatively large area which is kept in a wetted condition. The liquid spread in this manner evaporates, the heat for such evaporation being taken up from air flowing over the exterior surfaces of the tubes 26 and fins 27, for example. The spreading of liquid over a large surface area extending toward the top parts of tubes 26 is extremely desirable, because practically all of the heat transfer is then effected directly to liquid. Thus, even though only the force of gravity is available to cause distribution of liquid, the grooves 50 in the tubes 26 are advantageously utilized to promote and facilitate spreading of the liquid.

In an absorption refrigeration system generally like that described above and illustrated in Fig. 1, tubes 26 provided with grooves like the grooves 50 have been found to be extremely satisfactory. In such a system containing a 40% solution of lithium chloride by weight, the ratio of vapor volume to liquid volume is on the order of 10,000 to 1 at an evaporator temperature of about 50° F., the vapor pressure in the evaporator under such conditions being approximately 9 mm. mercury. In an evaporator of this kind, forming of liquid pools is objectionable because of the likelihood of the occurrence of liquid disturbances. The liquid disturbances may be termed superheating and result from lack of liquid agitation, so that the more or less stagnant liquid as it approaches vaporization temperature resists changing from liquid phase to vapor phase. Under these conditions a vapor bubble forming below the liquid surface level can cause a violent upward surge of liquid which is more pronounced the greater the distance of the vapor bubble below the liquid surface level.

Due to the relatively large ratio of vapor volume to liquid volume and the effect produced by superheating, the formation of vapor bubbles can be so rapid that refrigerant will be blown from the tubes and lost so far as any further refrigerating effect is concerned. By merely causing liquid to trickle along the bottom parts of the tubes 26, by keeping the liquid level at an extreme minimum, and by providing the grooves 50, a thin layer of liquid refrigerant is formed over a large portion of the inside surfaces of the tubes.

The refrigerant changes from liquid to gas phase by vaporization which is in the nature of boiling as contrasted with the manner in which evaporation takes place solely by surface phenomenon. Vaporization by boiling takes place throughout the mass of liquid and differs in this important respect from the phenomenon of surface evaporation. While the grooves 50 cause a relatively thin layer of liquid to be formed which covers a large surface area within the tubes 26, nevertheless the vaporization of liquid at or from this liquid layer is still in the nature of boiling, without the objections resulting when pools of any depth are formed and violent boiling occurs with vapor bubbles forming below the surface level of liquid.

In the absorption refrigeration system referred to above in which evaporator tubes like the tubes 26 are employed, tubing having an outside diameter of one inch and a wall thickness of approximately .035 inch is employed with the interior thereof provided with a helical groove having about twenty passages or turns per linear inch of tubing. In such case the extreme bottoms of the V-shaped passages are approximately .023 inch from the outside or exterior wall of the tubing and the extreme ends of the lips 51 approximately .050 inch from outside wall of the piping. With V-shaped passages of the foregoing dimensions provided in evaporator tubing, spreading of liquid toward the top part of the tubing is readily effected by capillary action.

Although a single embodiment of the invention has been shown and described, it will be apparent that modifications and changes may be made without departing from the spirit and scope of the invention. While the improvement for promoting spreading of liquid in piping has been embodied in an evaporator of an absorption refrigeration system like that described in the aforementioned Thomas and Anderson application, it should be understood that the invention may be used equally well in evaporators of other types of refrigeration systems. Moreover, piping grooved in the manner described herein can be employed equally well in absorbers of refrigeration systems to promote spreading of absorption liquid and provide as large a gas and liquid contact surface as possible for an absorber of a given size. It is therefore contemplated to cover all modifications and changes which come within the spirit of the invention, as pointed out in the following claims.

What is claimed is:

1. A heat transfer device having a wall through which heat is transferred between a fluid on one side and a liquid contacting a portion of the other side, the side of the wall contacted by the liquid having a capillary liquid-lifting surface forming an integral part of the wall structure and extending upwardly from the level of the liquid to carry the liquid upwardly on to the wall surface above the liquid level by capillary action to wet the wall surface with the liquid.

2. A heat transfer device having a wall through which heat is transferred between a fluid on one side and a liquid contacting a portion of the other side, the side of the wall contacted by the liquid having capillary grooves extending upwardly from the level of the liquid to carry the liquid upwardly on to the wall surface above the liquid level by capillary action to wet the wall surface with the liquid.

3. A heat transfer device in the form of a cylindrical tube adapted to transfer heat between a fluid on one side and a liquid contacting a portion of the other side of the wall thereof, the side of the tube wall contacted by the liquid having capillary grooves extending upwardly from the level of the liquid to carry the liquid upward on to the wall surface above the liquid level by capillary action to wet the wall surface with the liquid.

4. A heat transfer device comprising an enclosed container means only partially filled with a volatile liquid leaving a space for vapor above the surface of the liquid, the interior walls bordering the vapor space of the container means being of metal and being provided with a capillary surface forming an integral part of the wall structure of the container means, said capillary surface extending from the surface of the liquid upwardly to carry the liquid through capillary action up over the wall surface bordering the vapor space to keep this wall surface wetted with liquid.

5. A heat transfer device comprising an enclosed container means only partially filled with a volatile liquid leaving a space for vapor above the surface of the liquid, the interior of the container means being provided with a structure having capillary grooves extending upwardly from the surface of the volatile liquid into the vapor space, said capillary grooves having walls spaced sufficiently close together that the volatile liquid will be attracted to all parts of the grooves by capillary action.

6. A heat transfer device comprising an enclosed container means only partially filled with a volatile liquid leaving a space for vapor above the surface of the liquid, the interior of the container means being provided with a structure having capillary grooves extending upwardly from the surface of the volatile liquid into the vapor space, said capillary grooves having substantially parallel walls spaced sufficiently close together that the volatile liquid will be attracted to all parts of the grooves by capillary action.

7. A refrigeration apparatus having a wall through which heat is transferred between liquid on the interior of the wall and a fluid contacting the exterior surface of the wall, said apparatus being so constructed and arranged that liquid flows by gravity on one part of the interior of said wall when the apparatus is operated, the interior of said wall having capillary grooves extending upwardly from the level of the liquid to carry the liquid upwardly on to the wall surface above the liquid level by capillary action to wet the wall surface with the liquid.

8. Refrigeration apparatus as set forth in claim 7, in which said wall structure is formed by a tube.

9. Refrigeration apparatus as set forth in claim 7, in which said wall structure is formed by a tube and said grooves form a cylindrical helix.

10. Refrigeration apparatus as set forth in claim 7, in which said wall structure is formed by a substantially horizontal tube and said one interior part thereof is the bottom of the tube.

11. Refrigeration apparatus as set forth in claim 7, in which said wall structure is formed by a substantially horizontal tube, said one interior part thereof being the bottom of the tube, and said grooves form a cylindrical helix.

12. Refrigeration apparatus as set forth in claim 7, in which said grooves are V-shaped.

WILLIAM L. O'BRIEN.

REFERENCES CITED

The following references are of record in the file of this patent:

UNITED STATES PATENTS

| Number | Name | Date |
| --- | --- | --- |
| 1,878,803 | Altenkirch | Sept. 30, 1932 |
| 1,913,469 | Altenkirch | June 13, 1933 |
| 1,931,268 | Philipp | Oct. 17, 1933 |
| 1,958,403 | Shafner | May 8, 1934 |
| 1,996,080 | Heitman | Apr. 9, 1935 |
| 1,976,800 | Nesselmann | Oct. 16, 1934 |
| 2,133,819 | Howse et al. | Oct. 18, 1938 |
| 2,287,492 | Brown | June 23, 1942 |
| 2,317,234 | Thomas | Apr. 20, 1943 |
| 2,350,347 | Gaugler | June 6, 1944 |